United States Patent
Jansson et al.

(10) Patent No.: US 7,157,830 B2
(45) Date of Patent: Jan. 2, 2007

(54) NEAR-RESONANCE WIDE-RANGE OPERATING ELECTROMECHANICAL MOTOR

(75) Inventors: Anders Jansson, Uppsala (SE); Stefan Johansson, Uppsala (SE); Olov Johansson, Uppsala (SE); Jonas Eriksson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 130 days.

(21) Appl. No.: 10/404,090

(22) Filed: Apr. 2, 2003

(65) Prior Publication Data

US 2004/0195935 A1 Oct. 7, 2004

(51) Int. Cl.
*H02N 2/00* (2006.01)
*H01L 41/09* (2006.01)
*H01L 41/083* (2006.01)

(52) U.S. Cl. .......... 310/317; 310/323.02; 310/323.08; 310/323.17; 310/328; 310/330; 310/331

(58) Field of Classification Search ............... 310/312, 310/317, 330, 331, 323.01–323.09, 323.11–323.17, 310/328; 331/154–156, 160–164, 158
See application file for complete search history.

(56) References Cited

U.S. PATENT DOCUMENTS

| | | | | |
|---|---|---|---|---|
| 2,805,400 A | * | 9/1957 | Seddon ........................ 333/187 |
| 4,012,647 A | * | 3/1977 | Balamuth et al. ........... 310/317 |
| 4,523,120 A | * | 6/1985 | Assard et al. .......... 310/323.17 |
| 4,742,260 A | * | 5/1988 | Shimizu et al. ........ 310/323.16 |
| 5,039,899 A | * | 8/1991 | Yamaguchi ............ 310/323.16 |
| 5,136,200 A | * | 8/1992 | Takizawa et al. ...... 310/323.16 |
| 5,200,665 A | * | 4/1993 | Iijima .................... 310/323.16 |
| 5,311,093 A | * | 5/1994 | Mukohjima .................. 310/317 |
| 5,416,375 A | * | 5/1995 | Funakubo et al. ..... 310/323.16 |
| 5,453,653 A | * | 9/1995 | Zumeris ................. 310/323.16 |
| 5,578,888 A | * | 11/1996 | Safabakhsh .................. 310/328 |
| 5,616,980 A | * | 4/1997 | Zumeris ................. 310/323.16 |
| 5,640,063 A | * | 6/1997 | Zumeris et al. ............. 310/328 |
| 5,682,076 A | * | 10/1997 | Zumeris ................... 360/78.05 |
| 5,821,667 A | * | 10/1998 | Takagi et al. ................ 310/317 |
| 5,821,670 A | * | 10/1998 | Tobe et al. .................. 310/328 |
| 5,877,579 A | * | 3/1999 | Zumeris ................. 310/323.01 |
| 5,938,677 A | * | 8/1999 | Boukhny et al. ............ 606/169 |
| 5,955,819 A | * | 9/1999 | Takano et al. ......... 310/316.01 |
| 6,064,140 A | * | 5/2000 | Zumeris ................. 310/323.02 |
| 6,134,964 A | * | 10/2000 | Jaenker et al. ............ 73/514.21 |
| 6,373,170 B1 | | 4/2002 | Hills .......................... 310/328 |

(Continued)

FOREIGN PATENT DOCUMENTS

EP 0552754 A1 * 7/1993

(Continued)

*Primary Examiner*—Thomas M. Dougherty
(74) *Attorney, Agent, or Firm*—Young & Thompson

(57) ABSTRACT

The present invention combines bending mode mechanical ($f_{rm}$) and electrical ($f_{re}$) resonances, whereby a relatively good efficiency can be achieved within a relatively broad frequency range ($\Delta f_3$). An electrical resonance ($f_{re}$) or mechanical resonance is designed to be situated in the same order of magnitude as another mechanical resonance ($f_{rm}$), but separated therefrom. Preferably, the separation ($\Delta f_2$) is smaller than $2f_1/Q_1$, where $f_1$ is the resonance frequency for the resonance having lowest quality value, and $Q_1$ is the corresponding quality value of the mechanical resonance. An electromechanical motor comprising a driving element and electrical resonance circuit according to the above ideas may comprise a double bimorph driving element having one single actuating point influencing a body to be moved. The double bimorph driving element is excited in bending vibrations perpendicular to a main displacement direction, whereby both tangential and perpendicular motions are created by bending mode vibrations.

11 Claims, 6 Drawing Sheets

U.S. PATENT DOCUMENTS

| | | | |
|---|---|---|---|
| 6,392,328 B1 * | 5/2002 | Ashizawa | 310/323.01 |
| 6,437,485 B1 | 8/2002 | Johansson | 310/332 |
| 6,459,190 B1 | 10/2002 | Johansson et al. | 310/323.16 |
| 6,617,759 B1 * | 9/2003 | Zumeris et al. | 310/323.17 |
| 7,005,776 B1 * | 2/2006 | Iino et al. | 310/316.01 |
| 2002/0015507 A1 * | 2/2002 | Harris et al. | 381/431 |
| 2002/0089259 A1 * | 7/2002 | Iino et al. | 310/325 |
| 2003/0048037 A1 * | 3/2003 | Boyd | 310/318 |
| 2003/0234596 A1 * | 12/2003 | Johansson et al. | 310/328 |
| 2004/0080243 A1 * | 4/2004 | Miyazawa | 310/328 |

FOREIGN PATENT DOCUMENTS

| | | | | |
|---|---|---|---|---|
| JP | 61-076078 | * | 4/1986 | |
| JP | 1-305699 A | * | 12/1989 | 331/154 |
| JP | 4-340280 | * | 11/1992 | |
| JP | 5-237458 A | * | 9/1993 | 310/330 |
| JP | 5-344759 A | * | 12/1993 | 310/330 |
| JP | 06-014563 | * | 1/1994 | |
| WO | WO 02/075913 | | 9/2002 | |

* cited by examiner

NEAR-RESONANCE WIDE-RANGE OPERATING ELECTROMECHANICAL MOTOR

TECHNICAL FIELD

The present invention relates in general to electromechanical motor systems and in particular to drive arrangements of electromechanical motor systems.

BACKGROUND

Electromechanical motors are increasingly being used in many different applications. An electromechanical motor creates motion and forces by intermittent friction contact between the body to be moved and has a motor stator that contains electromechanical material. Small geometrical dimensions, relatively high energy efficiency, relatively high speed and positioning accuracy are appreciated properties in most applications. However, optimizing one of these properties often results in a degradation in some other respect. For linear motion, vibration types of motors are most common, and these are based on a dynamic relative motion between driving elements and the body to be moved.

Vibration types of motors are generally driven at high frequencies. Since only a small part of the energy put into the driving elements is transformed into mechanical energy, a large portion of the energy is not used in a single cycle. In a basic design, this energy is simply dissipated as heat in the electronics or motor, which could cause severe temperature problems. The energy use thus has to be more efficient.

In order to achieve acceptable energy efficiency, it is known to use different kinds of resonance phenomena. The most common is to use a mechanical resonance of the driving elements and/or body to be moved. These prior art motors use a mechanical resonance to store the input energy as mechanical vibrations until this energy eventually is used for mechanical work. Since less electrical energy is transported forth and back to the active elements, there will be less electrical losses in this case. Furthermore, the resonance behavior makes it possible to drive the motors with lower input voltage for a given stroke. There are a huge number of resonant vibration motors. A few typical examples are going to be mentioned somewhat more in detail.

The U.S. Pat. No. 6,373,170 discloses a motor having a driving part with two separate blocks, inclined with a given angle relative to each other. The blocks operate with a so-called 33-actuation (actuating strain parallel to the electrical field) and use an interlinking drive pad to drive a rail. The entire V-shaped unit extends perpendicular to the moving rail with the individual actuators at a certain angle relative to the main displacement direction. The two actuators are driven in mechanical resonance using longitudinal vibration modes with a phase shift between the two actuators giving an elliptical trajectory of the drive pad. The phase shift between the electrodes is e.g. used to control the direction of motion.

The U.S. Pat. No. 5,453,653 discloses driving with one actuator plate with several electrodes. The actuator operates with a so-called 31-actuation (actuating strain perpendicular to the electric field) with two different resonance modes at the same time, creating an elliptical trajectory of the drive pad attached to a certain position of the actuator. One resonance mode is a bending mode and the other resonance is a longitudinal resonance mode. The longitudinal resonance mode is used for creating a motion perpendicular to the body to be moved. A phase shift between the waveforms supplied to the electrodes is used to control the direction of motion. The plate is oriented perpendicular to the moving rail.

The U.S. Pat. No. 6,392,328 discloses an arrangement with one actuator beam with several electrodes and operating with a 31-actuation at two different resonant modes. Also here, one resonance mode is a bending mode and the other resonance is a longitudinal resonance mode. This creates elliptical trajectories of the two drive pads in contact with the rail. The motion along the rail is here caused by the longitudinal resonance mode. The beam is attached to the support in the central part of the beam. By changing the phase shift of the waveforms supplied to the two drive electrodes, the direction of motion can be controlled. The beam is oriented in parallel with the rail.

However, a large drawback for mechanical resonance motors is that the actual resonance frequency is typically very sensitive even to small details of the design. Manufacturing of device parts has to be very accurate in order to achieve a predetermined resonance frequency. Also thermal and mechanical effects, such as heat expansion or wear, may alter the resonance frequency considerably. This puts demands on the electronics to be designed for compensating frequency variations. Such solutions are neither inexpensive nor small in size.

Moreover, positioning accuracy of mechanical resonance motors is often difficult to control. Also after terminating the energy input to the resonating parts, these parts will continue to vibrate until the stored energy has been dissipated in one way or another. The damping of the vibration is determined by the mechanical design factors. In general, the higher amplitude amplification that is used for the motion, i.e. the higher Q-value of the resonance, the more difficult becomes the halting control.

Another large drawback with many prior art mechanical resonance motors is that they utilize resonances of longitudinal vibrations, i.e. an extension or contraction of a piezoelectric element. The longitudinal vibrations have some disadvantages that make such solutions less attractive for small ultrasonic motors. The most severe is that the lowest longitudinal resonance frequency for a small motor will be very high. Typically a motor, one centimeter long, would have resonance frequencies above 200 kHz. This creates a problem from an electromagnetic compatibility (EMC) point of view.

In applications, where the longitudinal vibration is used for creating the actual tangential motion of the body to be moved, the driving elements have to operate with at least two contact points towards the body to be moved. Such arrangements will be larger than an arrangement with a single contact point, providing equal strokes.

The U.S. Pat. No. 6,437,485 discloses an arrangement having one actuator beam with several electrodes, operating with 31-actuation close to one fundamental resonance frequency. With a bending section in each half of the beam, activating either one or the other bending section can reverse the motion. Asymmetric driving and a frequency slightly off-resonance are used to get a 2D trajectory of the single drive pad that is placed in the center of the beam. The beam is oriented in parallel with the rail.

This type of vibrator has many advantages over other vibrators of prior art. The simple support in combination with an orientation in parallel with the rail makes it possible to build a motor with very small lateral dimensions. Furthermore, since there is no need to operate the beam in exact mechanical resonance, the drive electronics can be designed more simple. The use of only one drive pad makes it possible to get a longer stroke without making the whole motor unit larger, since the rail length can be as short as the stroke plus the width of the contact pad. The main disadvantage of this motor construction is that it is difficult to get a high efficiency and that it has to be designed carefully to function as desired.

Another resonance that can be used to improve energy efficiency is an electrical resonance. By using the actuator capacitance as a part of an electrical resonance circuit and tuning the electrical resonance to the frequency used in moving the driving elements, an improved efficiency can be reached. An electric resonance circuit is then used to store the input energy as electric or electromagnetic energy until this energy eventually is used for mechanical work. The resonance circuit will also give rise to a voltage enhancement, which allows for using lower voltage power supply.

The normal solution to create electrical resonance is to combine an inductive and capacitive component.

Several inventors have explored inductors in series or in parallel with a piezoelectric actuator. Typically the inductive component is used to reduce the resistive losses as well as transferring the stored energy to the battery or the actuator. A few inventions have concerned electrical resonance where an inductive component is connected with an electromechanical capacitive load. A typical example of a vibrator using an electrical resonance circuit is disclosed in the translated Japanese patent abstract JP 61-139284. Here an inductive element is connected in series or in parallel with a piezoelectric vibrator, which has a capacitive behavior. A commercial power source of 50 or 60 Hz is connected to the resonance circuit for providing the input power. The resonance circuit makes it possible to increase the voltage to the actuator relative the voltage of the power source.

In U.S. Pat. No. 6,459,190 an electric resonance circuit is disclosed. One inductor is connected in parallel to the piezoelectric capacitance, in order to enhance the efficiency. An additional inductor connected in series with a capacitance transforms the applied square wave to a sinusoidal wave by series resonance improving the efficiency further. The two circuits have preferably the same resonance frequency.

SUMMARY

A general problem with resonance solutions according to prior art is that the resonant behavior is restricted to very narrow frequency ranges. Small inaccuracies, variations in temperature or wear may therefore influence the resonant behavior strongly, in particular for mechanical resonances, which calls for adjustment possibilities in electronics and/or mechanical parts. A further problem with mechanical resonance solutions of prior art is that a high positioning accuracy is difficult to achieve. Another problem with small mechanical resonance solutions according to prior art is that the resonance frequencies become too high.

A general object of the present invention is thus to provide for a broader frequency range in which a fairly high energy efficiency is provided, i.e. an extended operation range. A further object of the present invention is to provide driving element designs for small lateral dimensions and allowing a wide-range resonance. Yet a further object is to provide a system, which does not need frequency correction circuits. Another object of the present invention is to provide resonant drive systems allowing improved positioning accuracy with maintained energy efficiency.

The above objects are achieved by systems according to the enclosed patent claims. In general words, in a first aspect, by combining one mechanical resonance with an electrical resonance, a relatively good efficiency can be achieved within a relatively broad frequency range. The cooperating resonances should be arranged to be situated at the same order of magnitude. Preferably, the separation is less than $2f_{rm}/Q_m$, where $f_{rm}$ is the mechanical resonance frequency and $Q_m$ is a quality of the same resonance, and preferably also less than $f_{rm}/Q_m$. At the same time the resonance frequencies do not have to exactly coincide for achieving advantages. An enhanced operation frequency range is provided by letting the resonance frequencies be separated by more than $\frac{1}{4}f_{re}/Q_e$, where $f_{re}$ is the electrical resonance frequency and $Q_e$ is a quality of the same resonance.

In a second aspect, by combining two mechanical bending mode resonances, a relatively good efficiency can similarly be achieved within a relatively broad frequency range. The cooperating resonances should be arranged to be situated at the same order of magnitude. Preferably, the separation is less than $2f_{rm1}/Q_{m1}$, where $Q_m$ is the lowest quality measure of the two resonances and $f_{rm1}$ is the corresponding mechanical bending mode resonance frequency.

Also a combination of more than one resonance of each type is feasible, e.g. two mechanical bending mode resonances with one electrical resonance, preferably designed to be situated between the mechanical bending mode resonances, or two electrical resonances with one mechanical bending mode resonance, where the mechanical resonance is situated between the two electrical ones.

The properties of the mechanical bending mode resonance are determined by the mechanical design of the driving element, such as the bending length and stiffness, as well as of the force with which the driving element is pressed against the body to be moved. The properties of the electrical resonance are determined by the capacitance of the driving element and by electrical components in an electrical resonance circuit.

An electromechanical motor comprising a driving element and electrical resonance circuit according to the above ideas may comprise a double bimorph driving element having one actuating point influencing a body to be moved. The double bimorph driving element is excited in bending vibrations perpendicular to a main displacement direction. Preferably, more than one bending mode is excited, the resonance frequencies of which are combined with the electrical resonance of the electrical resonance circuit.

The advantages with the present invention is that a stable operation of driving elements can be achieved in a broader frequency range, maintaining a fairly high energy efficiency. Positioning accuracy is improved due to the fast quenching of an electrical resonance. Control electronics can thereby be made simpler and more inexpensive.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosure, the term "resonance mode" will refer to the nature of a mechanical resonance. In other words a "mode" denotes e.g. if the resonance is associated with a longitudinal or transversal vibration. A "bending mode" is thus to be referred to as a transversal vibration essentially perpendicular to a main extension of an element, where the strokes vary along the extension of the element. A vibration resonance "order" concerns essentially the number of nodes or antinodes of a resonance vibration.

Figure 1:
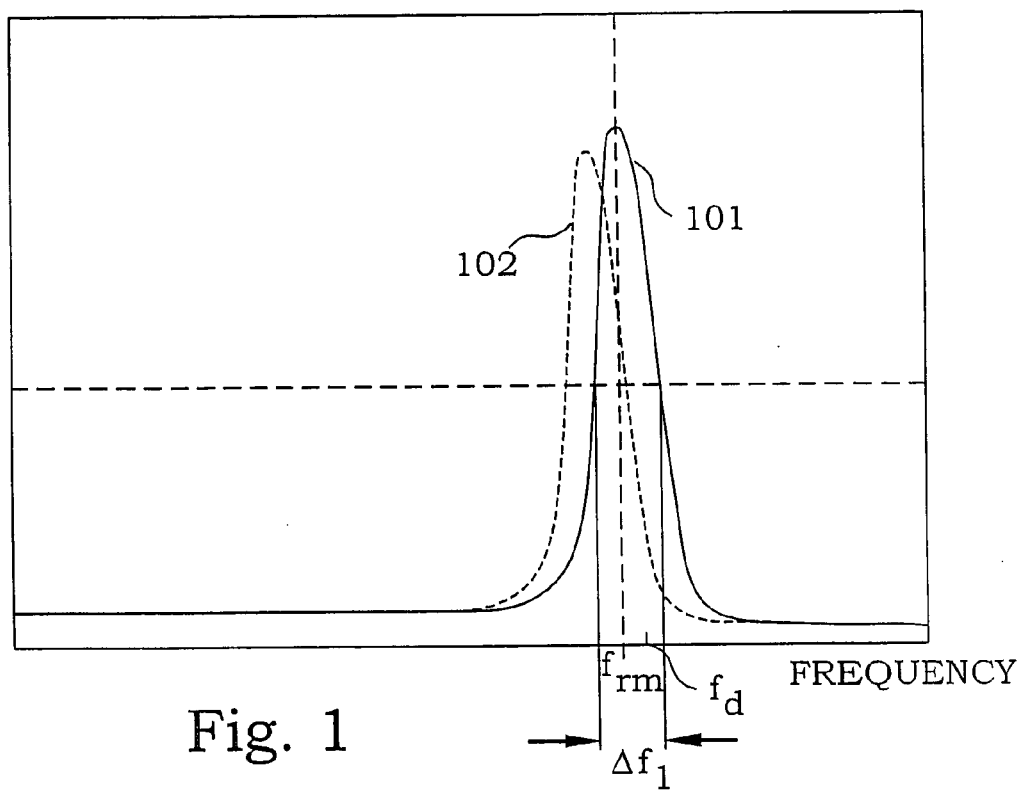
FIG. 1 is a diagram illustrating a mechanical resonance behavior of a driving element.

In a motor based on a mechanical resonance, the energy efficiency will have a strong frequency dependence. In FIG. 1, an idealized mechanical resonance behavior is illustrated by the curve 101. At a certain resonance frequency, $f_{mr}$, the energy utilization efficiency or vibration amplitude is increased, since energy is stored in the actual driving element as mechanical vibrations until it is used for moving a body. The efficiency of a mechanically resonant motor is normally directly related to the amplification of the vibration amplitudes, which therefore can be used as a rough measure of efficiency. The mechanical resonance used in previous ultrasonic motors is typically rather strong and have in many cases a fairly narrow bandwidth. A Q-value much above 10 is common. The actual bandwidth depends on design structures of the driving element. This means that a significant vibration amplitude enhancement only occurs in a relatively limited frequency range. In FIG. 1, a vibration amplitude exceeding half the maximum amplitude is achieved in a frequency interval $\Delta f_1$.

The intention with this kind of drive is that a driving frequency $f_d$ should coincide with the resonance frequency $f_{mr}$. However, the actual resonance frequency $f_{mr}$ depends strongly on many different factors and it is difficult to ensure that the resonance frequency $f_{mr}$ becomes exactly the one intended during the design, which gives a risk for an offset between $f_d$ and $f_{mr}$. Due to the mechanical tolerances in the various motor parts and in the assembling operations, the difference in mechanical resonance frequency of individual motors might be rather large.

Furthermore, the actual resonance frequency $f_{mr}$ is also dependent on factors that might vary with time. Examples of such factors are temperature, wear and load. This means that the resonance frequency may vary slightly with time. In FIG. 1, a frequency resonance curve 102 represents a (fictive) situation of a driving element having an elevated temperature and that has been exposed to a certain amount of wear. One realizes immediately, that without any electronics continuously detecting and compensating for any changes in resonance behavior, the efficiency of the motor may vary a lot. Resonance detecting and compensating electronics is both costly and space consuming, which makes it inconvenient to use at least in many consumer types of products.

As discussed in the background section, longitudinal vibrations are not very attractive when designing small resonant or near-resonant ultrasonic motors. In order to reach reasonably low resonance frequencies, driving element dimensions become inconvenient large. Bending mode vibrations, in particular connected with beam-shaped driving elements extending along the body to be moved, are at the moment believed to be the only resonant phenomena that could be considered to create tangential and perpendicular motions in such small (<1 cm) motors.

Figure 2:
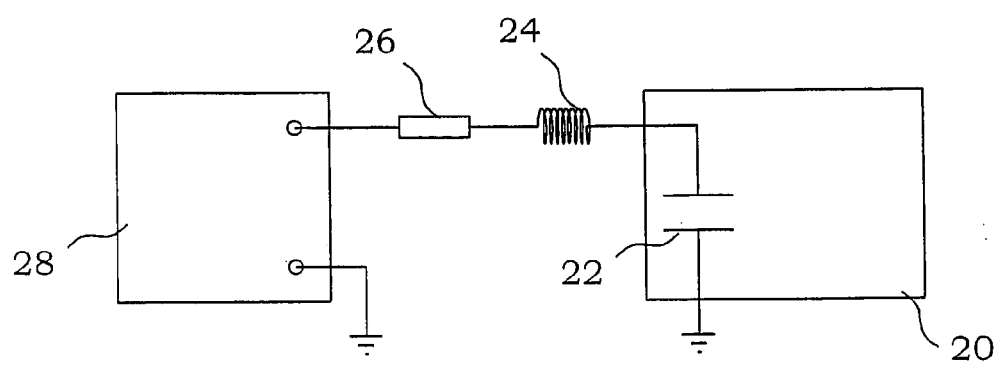
FIG. 2 is a block scheme of an electrical resonance circuit comprising an electromechanical driving element.

In FIG. 2, a simple electric resonance circuit 10 is illustrated. A piezoelectric driving element 20 is connected to a voltage source 28 via an inductor 24 and a resistor 26. The driving element 20 comprises piezoelectric material disposed between electrodes. This arrangement is electrically to be characterized as a capacitive element 22. The resistor 26 is intended to comprise any resistive components of the circuit. The electric resonance circuit 10 is thus a series resonance circuit based on the capacitive element 22 and the inductor 24. Such a circuit has an electrical resonance frequency $f_{er}$ determined by:

$$f_{er} = 1/2\pi\sqrt{LC},$$

and a quality measure $Q_e$, determined by the resistance according to:

$$Q_e = \frac{1}{R}\sqrt{\frac{L}{C}}.$$

If electrical energy is supplied from the voltage source 28 with a frequency coinciding with the electrical resonance frequency, electrical energy will be stored as a resonance between the capacitance 22 and the inductance 24.

Figure 3:
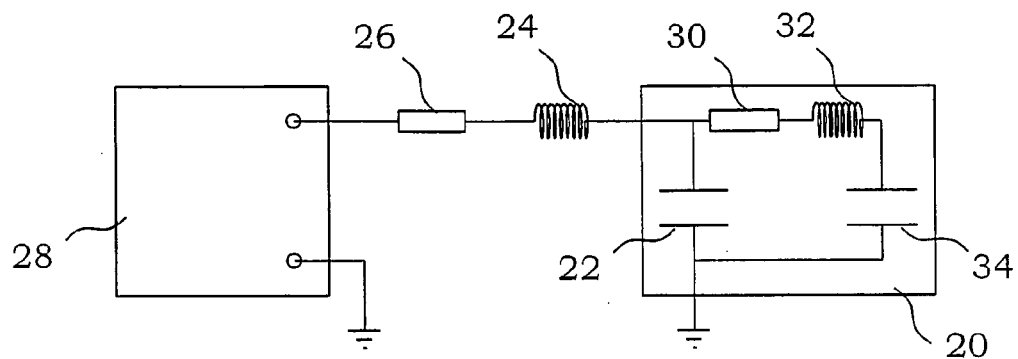
FIG. 3 is an electric block scheme with an equivalent mechanical resonance circuit of an electromechanical driving element.

A mechanical resonance can be modeled as an equivalent electrical resonance circuit. In FIG. 3, a new circuit is illustrated, where the mechanical vibration properties of the driving element instead are depicted in terms of equivalent electrical components. This is a way to illustrate a combined electrical and mechanical resonance system in an easily interpretable manner. The mechanical vibration behavior of the driving element can be represented by a "mechanical" capacitance 34, a "mechanical" inductance 32 and a "mechanical" resistance 30. To be more specific, this equivalent "mechanical" circuit represents one vibration mode of the driving element 20. If the driving element 20 has more vibration modes of interest, each of these modes can be represented by its own equivalent circuit of electrical components.

The capacitance 34 and inductance 32 are caused by the shape alteration of the material. The ability to store energy as elastic energy in the driving element and as kinetic energy of the different moving portions of driving element defines the quantities of the capacitance 34 and inductance 32.

Similarly, the energy losses in the mechanical vibration of the driving element 20 defines the value of the equivalent resistance 30. This kind of equivalent scheme is e.g. found in "An Introduction to Ultrasonic Motors", Oxford University Press 1993, by T. Sashida & T. Kenjo, pp. 65–59. The dielectric capacitance 22 is typically about 100 times larger than the mechanical equivalent capacitance 34.

Figure 4:
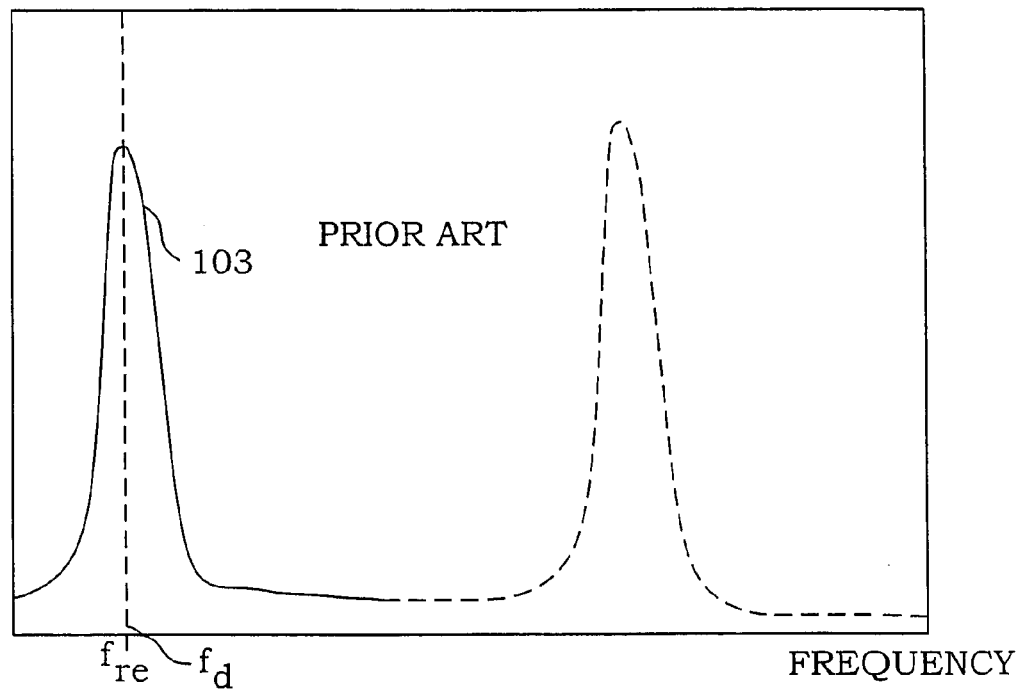
FIG. 4 is a diagram illustrating an efficiency diagram of prior art electrical resonance devices.

In prior-art use of electrical resonance circuits, a driving frequency is adapted to an electrical resonance frequency fir, far below any mechanical resonance. In JP 61-139284, the driving frequency was 50 or 60 Hz, far below any mechanical resonance of driven electromechanical parts. In U.S. Pat. No. 6,459,190, only non-dynamic or pseudo-static driving mechanisms were of interest, which are situated far from any resonance frequencies. Such a situation can be illustrated by the diagram of FIG. 4. Here an electrical resonance $f_{er}$ is present in the low frequency regime. A driving frequency $f_d$ is adapted to coincide with the electrical resonance $f_{er}$. The mechanical resonance circuit (FIG. 3) has in such a case a negligible influence on the efficiency. First at very high frequencies, the mechanical resonance comes into consideration (as indicated by the broken portion of the curve 103).

To superimpose the electrical and mechanical resonance frequency, to let the $f_{er}$ and $f_{mr}$ assume basically the same value, i.e. utilize simultaneous mechanical and electrical resonance has to our knowledge not been used in prior art. In this context, it should be remembered that when manufacturing motors there is a distribution of resonance frequency within a batch of motors. For those few individual motors that happen to have exactly the right frequency an improved operation will occur at the electrical resonance. At another temperature, or after some wear has occurred, other motors in the batch will demonstrate an improved performance instead. Such a variation in performance is seldom acceptable, at least for high-Q mechanical resonances. The useful bandwidth with a given performance is not expected to be improved, but rather the opposite. Simultaneous high-Q electrical and mechanical resonance has therefore in prior art been believed to be of limited use.

Figure 5:
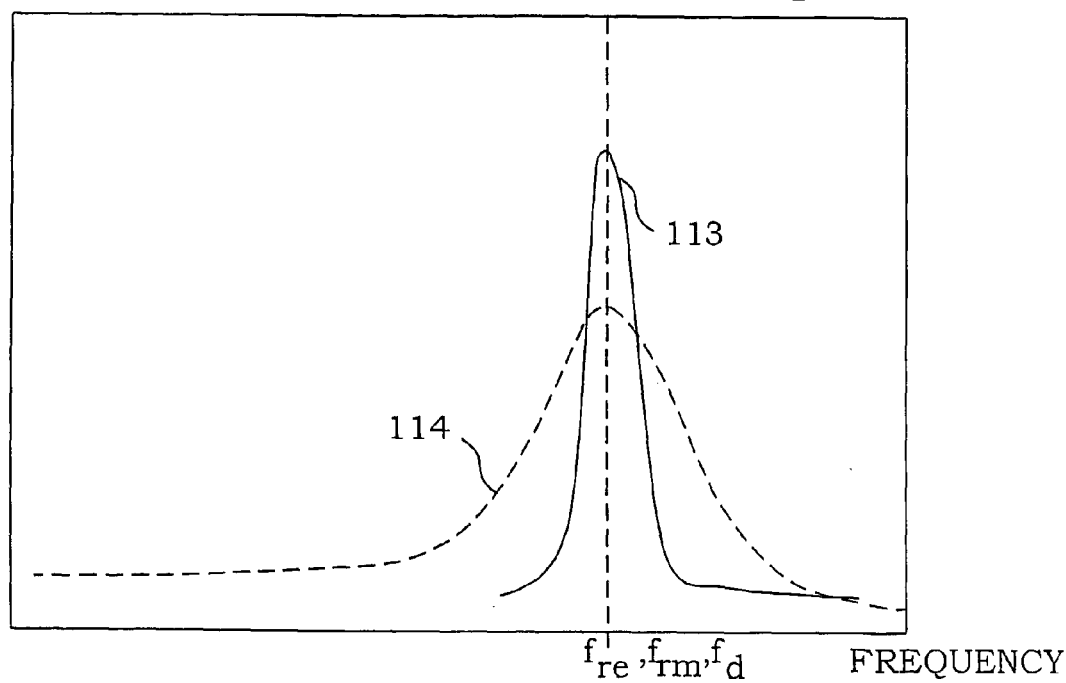
FIG. 5 is a diagram illustrating an efficiency diagram of combined electrical and mechanical resonance devices according to the present invention.

Surprisingly, according to one aspect of the present invention, electrical and mechanical resonance can beneficially be used together. In a near-resonance motor, i.e. a low Q-value resonance motor that is not crucially dependent on using strong mechanical resonance effects, but that very well may be used in the vicinity of the mechanical resonance anyway, a combined use of electrical resonance can be very advantageous indeed. A near-resonance motor has typically a low quality value (Q value) of the main mechanical resonance. Mechanical resonance is here used for a Q-value >1 and commonly the Q-values for these motors are in the range of 2–10. For a given mechanical amplitude, a motor with a low Q value requires a larger power than a resonant motor with a high Q value. However, in a low Q-value motor a larger portion of the mechanical energy is possible to convert into useful work in each cycle without interfering with the mechanical resonance. Therefore, a combination of electrical resonance and mechanical resonance may be very fruitful in such cases. FIG. 5 illustrates in a diagram a situation with an electrical resonance 113 essentially coinciding with a mechanical resonance 114. A somewhat lower Q-value of the mechanical resonance 114 reduces the demands on resonance frequency accuracy. The driving frequency $f_d$ is preferably also essentially coinciding with the resonances $f_{rm}$ and $f_{re}$.

Motor types with high and low Q-values, respectively, have completely different possibilities for transferring forces. This makes it difficult to make a simple comparison of efficiencies other than through experiments. These different types of motors also allow for different degrees of mechanical fine adjustments, different possibilities for use of soft ceramics and different complexity of the drive electronics, which also will be important in this context.

Figure 6:
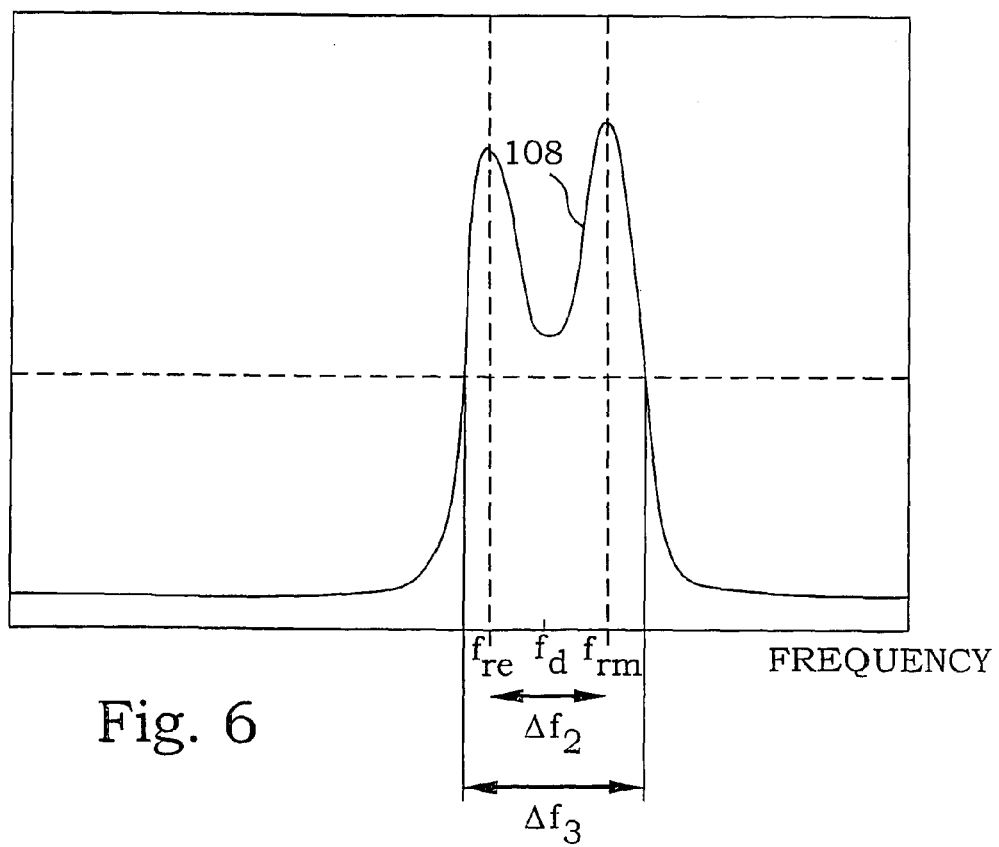
FIG. 6 is a diagram illustrating efficiency of an electromechanical driving element according to an embodiment of the present invention.

Electrical resonances can be utilized, not only exactly coinciding with mechanical resonances, but also when only being in the vicinity of each other. In FIG. 6, resonance properties of embodiments according to the present invention are presented as a curve 108. A driving element having a mechanical resonance $f_{rm}$ is subjected to an electrical resonance, having an electrical resonance $f_{re}$. The electrical resonance frequency $f_{rc}$ has a value that is in the same order of magnitude as the mechanical resonance $f_{rm}$, but separated from it. In FIG. 6, the resonances are separated by $\Delta f_2$. Since a near-resonance motor is not crucially dependent on being exactly at the mechanical resonance for its driving principles, the actual driving frequency can be varied over a rather large frequency interval and still give rise to quite stable vibration amplitudes. If one, in analogy with FIG. 1, determines a frequency region $\Delta f_3$ in which the vibration amplitude exceeds half the maximum amplitude, one realizes that this region exceeds the frequency region $\Delta f_1$. In fact, $\Delta f_3$ also exceeds the sum of $\Delta f_1$ and the electrical correspondence.

The diagram of FIG. 6 illustrates an idealized case. The resonances have almost identical Q-values and are generally well-behaving. However, also in practical cases and where the electrical and mechanical resonances behave completely different, the present invention will give advantages. By investigating different scenarios, it has been concluded that particularly large advantages are achieved when the frequency separation $\Delta f_2$ is within the range of $f_{r1}/Q_1$. $f_{r1}$ here denotes the resonance, electrical or mechanical, having the lowest Q value, and $Q_1$ is of course the corresponding Q value. In many cases, the electrical resonance has a higher Q value, and in such a case $f_{r1}=f_{rm}$ and $Q_1=Q_m$. The two resonances do apparently not need to be too close to each other. The frequency separation $\Delta f_1$ could actually be even larger, but the advantages are somewhat reduced if the separation exceeds 2 times $f_{r1}/Q_1$. The advantages in increasing operational frequency range are, however, most pronounced if the frequency separation is larger than $\frac{1}{4}f_{r2}/Q_2$. $f_{r2}$ here denotes the resonance, electrical or mechanical, having the highest Q value, and $Q_2$ is of course the corresponding Q value.

The electric resonance frequency is easily designed by selecting appropriate inductors and resistors to be incorporated into the electrical resonance circuit according to basic knowledge in electronics. In a simple electric resonance circuit of FIG. 2, the resonance frequency is determined by the values of the capacitance of the driving element and the inductance. The Q-value is further influenced by the resistive portions of the circuit. The mechanical resonance behavior is more difficult to tailor according to simple rules. However, also here, basic mechanics is applicable. This is discussed more in detail further below. In a typical case, a rough estimation of the mechanical vibration properties is made during the design of the driving elements. The actual resonance behavior is then experimentally evaluated and the electrical resonance circuit is adapted to fit to the mechanical behavior.

The actual driving frequency of the driving element can in an embodiment according to the present invention easily be selected within a relatively large frequency range. Any dependency of mechanical wear, temperatures, load etc.

therefore becomes less important. As a result of this, there is basically no use for any frequency-optimizing circuitry.

If the motors are designed to operate with a low Q-value, enhanced precision positioning can be achieved with the motor. An electrical resonance is possible to interrupt almost instantaneous in an easy manner, while a mechanical resonance has to cease more slowly. By combining electrical and mechanical resonances, additional advantages with respect to a pure combination of the earlier known advantages with either type of resonance, are provided. When making a sudden stop of the motion, the supply of electrical energy can be stopped instantaneously. The mechanical vibration still remains for a while, but since this is only a part of the total resonant energy, the damping to a condition where the driving element no longer operates is performed relatively fast. The accuracy of positioning mechanical resonance motors is in such a way improved.

Additionally, a related procedure for velocity control is achieved. By intermittently omitting one or several cycles of the voltage waveforms supplied to the driving element, the velocity of the motor can be controlled. E.g. if x voltage waves out of x+y cycles are sent repeatedly to the driving element, only a fraction of the maximum speed is provided. This allows for an easy velocity control. It is in this way also possible to continuously decrease the velocity when approaching a target position.

In another way to interpret the cooperation between electrical and mechanical resonances, the basic motion enhancement obtained by mechanical resonance is modified by adjusting the electric resonance part.

Furthermore, the Q-value of the electrical resonance is easier to control by just adjusting components that are mechanically inactive. The mechanical Q-value is in a more complex manner dependent on e.g. wear, temperature, load, geometrical features etc. Using high Q mechanical resonant motors calls for designs of the driving element with maximum stresses fairly far from the mechanical failure limit. For a low Q mechanical resonant motor the uncertainty in stresses becomes less crucial. The electrical Q-value can easily be controlled and smaller mechanical margins will therefore be needed.

Figure 7:
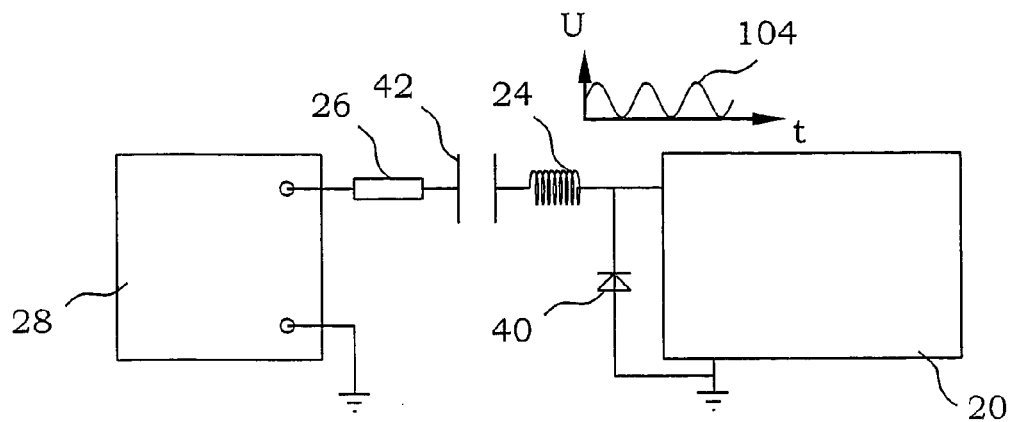
FIG. 7 is a block scheme of an embodiment of an electrical resonance circuit providing a bias voltage.

Driving elements used in this kind of applications comprises typically soft piezoelectric materials. Such materials have many advantages, but a severe disadvantage is that they cannot withstand large electric fields opposite to the polarization. In FIG. 7, a particularly useful embodiment of the electrical resonance circuit of the present invention is illustrated. In this embodiment, an additional capacitor 42 is introduced in series between the inductor 24 and the driving element 20. Furthermore, a diode 40 is connected in parallel with the driving element 20, prohibiting any negative voltage to be applied on the piezoelectric material, thereby protecting the soft piezoelectric material. The voltage source 28 is in this embodiment a square wave generator, with a voltage amplitude of U. The large capacitor 42 and the diode 40 enables a large positive bias voltage to build up during the first initial cycles. The capacitor 42 has a capacitance much larger than the capacitance of the driving element 20, e.g. ten times larger. This allows for an offset voltage to build up at the driving element 20, which thus is cycled at positive voltages only. This is indicated by the miniature diagram 104 incorporated in FIG. 7. The voltage can in this manner by varied between zero and typically 4–5times the input voltage U.

As described above, longitudinal vibrations are difficult to use in small size piezoelectric devices in a resonant manner due to the incompatibility between resonance frequencies and driving element size. Bending vibration modes are therefore the only alternative to use for small size motors. Combinations of longitudinal and bending mode resonances as shown in prior-art are thus not very useful. However, according to a second aspect of the present invention, two bending mode mechanical resonances can be used together for driving purposes.

In most mechanical devices, bending mode resonance frequencies of different orders are typically well separated. For instance, a first order bending resonance in a simple free beam has a frequency that is about 36% of the second order bending resonance. As will be described further below, there are, however, possibilities to manipulate mechanical devices in order to bring different bending mode resonance frequencies closer to each other. This makes it possible to also use a cooperation between resonances of the same vibration mode, but of different orders. This in strict contrary to prior art, where resonances of different vibration modes are utilized.

Figure 8:
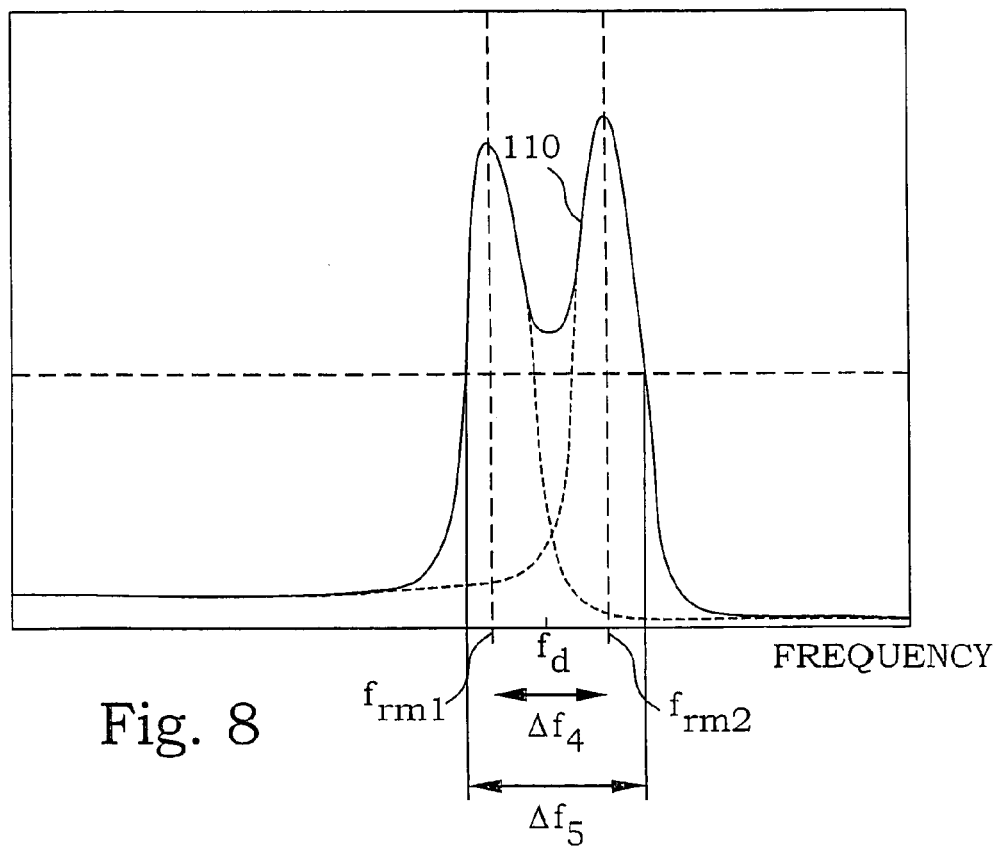
FIG. 8 is a diagram illustrating efficiency of an electromechanical driving element according to another embodiment of the present invention.

FIG. 8 illustrates a case where two bending mode resonances of different orders have frequencies in the same order of magnitude. A first bending mode resonance has a resonance frequency of $f_{rm1}$, e.g. a first order bending mode. A second bending mode resonance has analogously a resonance frequency of $f_{rm2}$, e.g. a second order bending mode. The resonance frequencies are separated by a frequency separation $\Delta f_4$. In this embodiment, the first mechanical bending mode resonance frequency thus has a value in the same order of magnitude as the second mechanical bending mode resonance frequency. Normally, however, the first mechanical bending mode resonance frequency is separated a certain frequency separation from the second mechanical bending mode resonance frequency. As discussed earlier the frequency separation is preferably smaller than $2f_{r1}/Q_1$, where $Q_1$ is the lowest quality value of the first and second resonances, respectively, and $f_{r1}$ is the corresponding resonance frequency. As can be seen, the amplitude of the first order bending mode is low at the frequency where the second order bending mode has a large amplitude and driving close to the higher frequency is therefore typically less advantageous.

Figure 9:
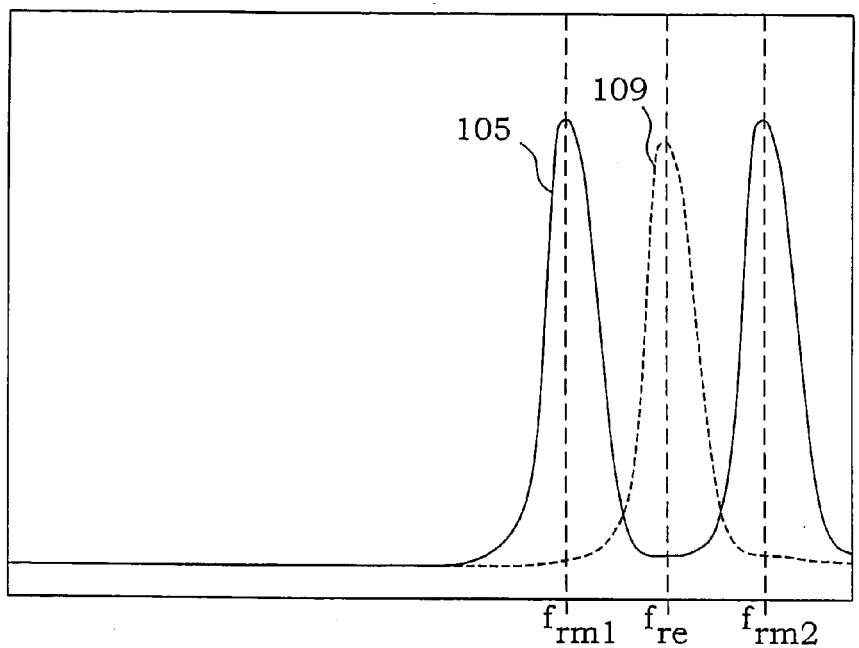
FIG. 9 is a diagram illustrating resonance behaviors having two mechanical resonances and one electrical resonance.

In the above description, the relation between two mechanical resonances has been investigated. However, it is also possible to use the basic ideas of the present invention with driving elements having more than one useful mechanical resonance together with an electrical resonance. In FIG. 9, a diagram illustrates a mechanical resonance behavior of a driving element having two resonance frequencies associated with two different bending vibration modes situated fairly close to each other in frequency. An efficiency/amplitude curve 105 illustrates a first resonance present at the frequency $f_{rm1}$, and a second resonance present at the frequency $f_{rm2}$. According to an embodiment of the present invention, an electrical resonance circuit can be made using such a driving element. The circuit is preferably designed in order to place a resonance frequency $f_e$ somewhere in the range between the two mechanical bending mode resonances, as shown by curve 109. (Note that in this particular diagram, efficiency effects caused by mechanical and electrical resonances are separated into two curves.) Depending on the actual motion principle, the operable frequency range in which an efficient operation can be achieved can in such a case be very large.

Figure 10:
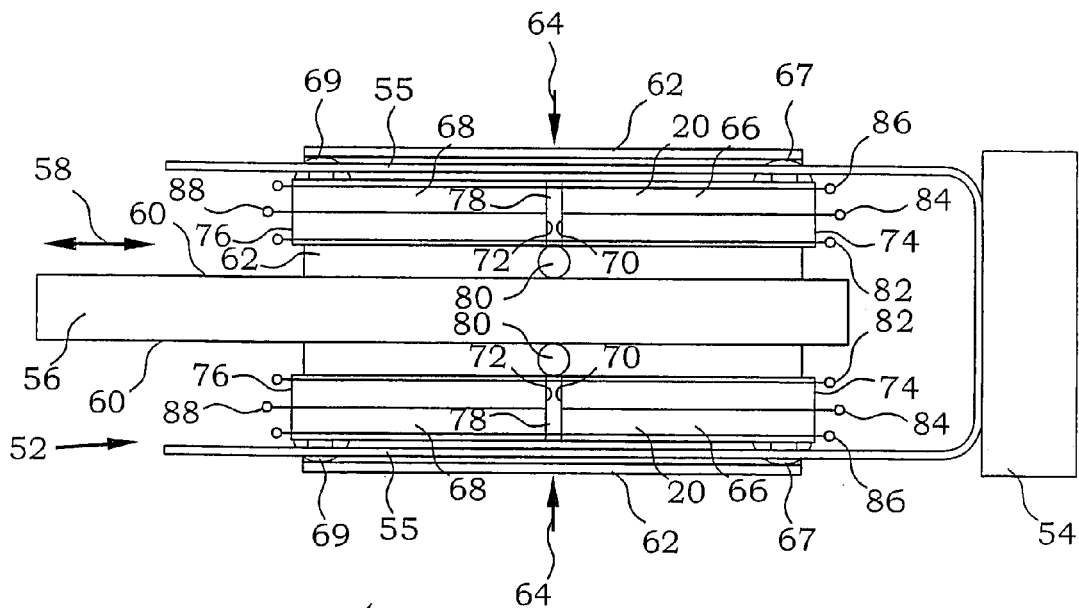
FIG. 10 is a block scheme of an embodiment of an electromechanical motor in which the present invention advantageously can be incorporated.

The above resonance principles can be applied to many different types of driving elements. Here, below, one embodiment of a drive unit, in which these resonance ideas easily can be implemented, is described more in detail, in connection with FIG. 10.

An electromechanical motor 50 comprises a stator arrangement 52 being disposed symmetrically on both sides of a body 56 to be moved in a main displacement direction (indicated by the double arrow 58). The stator 52 has at each side of the body 56 a driving element 20. The driving elements 20 are connected to a backbone portion 54 by a flexible film 55. The driving elements 20 are resting with two pivot supports 67, 69 each, through openings in the flexible film 55, on a resilient means 62. The resilient means 62 is arranged to apply a normal force 64 between the driving elements 20 and the body 56. The motion of the electromechanical motor 50 is achieved by the driving elements 20 interacting with an interaction surface 60 on each side of the body 56.

For simplicity, one side of the arrangement will now be described. The other side is arranged analogously. The driving element 20 comprises two bimorph sections 66, 68 extended in a main extension direction between a respective first end 70, 72 and a respective second end 74, 76. The bimorph sections 66, 68 are interconnected with each other at said respective first ends 70, 72 by an actuator member 78. The actuator member 78 has a single actuating portion, a drive pad 80, which is provided for performing the actual interacting action with the interaction surface 60. The main extension direction of the bimorph sections 66, 68 is essentially parallel to the main displacement direction 58. A similar behavior could be achieved with a unimorph or monomorph, while a multilayered bimorph is often preferred for low voltage operation.

The driving element 20 has electrodes 82, 84, 86, 88 for applying different voltages across the electromechanical material. The length of the bimorph halves will then change, giving rise to bending motions of the driving element 20. Using soft piezoelectric material, a constant voltage U is applied to the electrode 82 at one side of the bimorphs, and ground is connected to the electrode 86 at the opposite side. With hard material, the electrode 82 can be connected to ground. A middle electrode 84, 88 is provided for each bimorph, and the bending motions are achieved by supplying a control voltage to these electrodes. The driving element 20 has bending modes perpendicular to the main displacement direction 58. The two bimorph sections 66, 68 are in mechanical contact with the main part of the backbone portion 54 only via the flexible film 55.

Figure 11:
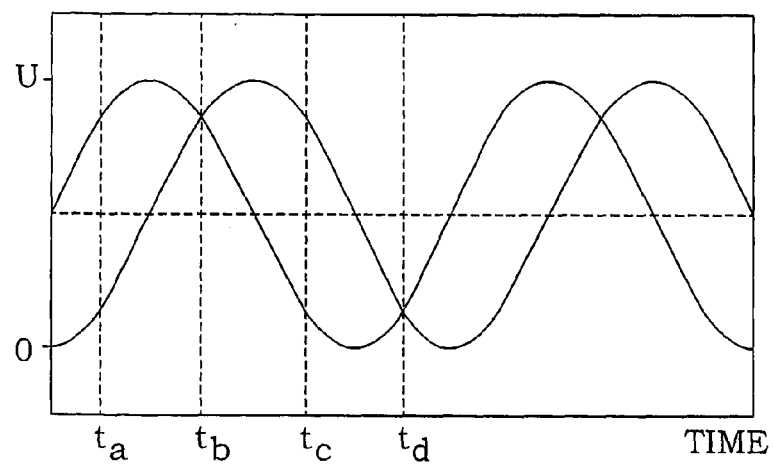
FIG. 11 is a diagram illustrating control voltage signals to a driving element according to FIG. 10.

Electrode 88 is provided with a sinusoidal voltage signal according to curve 106 in FIG. 11. Electrode 84 is provided with the same signal, but phase shifted 90° (i.e. delayed ¼ of the period time), according to curve 107. Such an excitation of the driving element 20 will give rise to a vibration pattern involving at least two different bending modes. It should be mentioned that the phase shift is typically adjusted experimentally to achieve the most advantageous behavior, but most often the phase shift is close to 90°.

Figure 12:
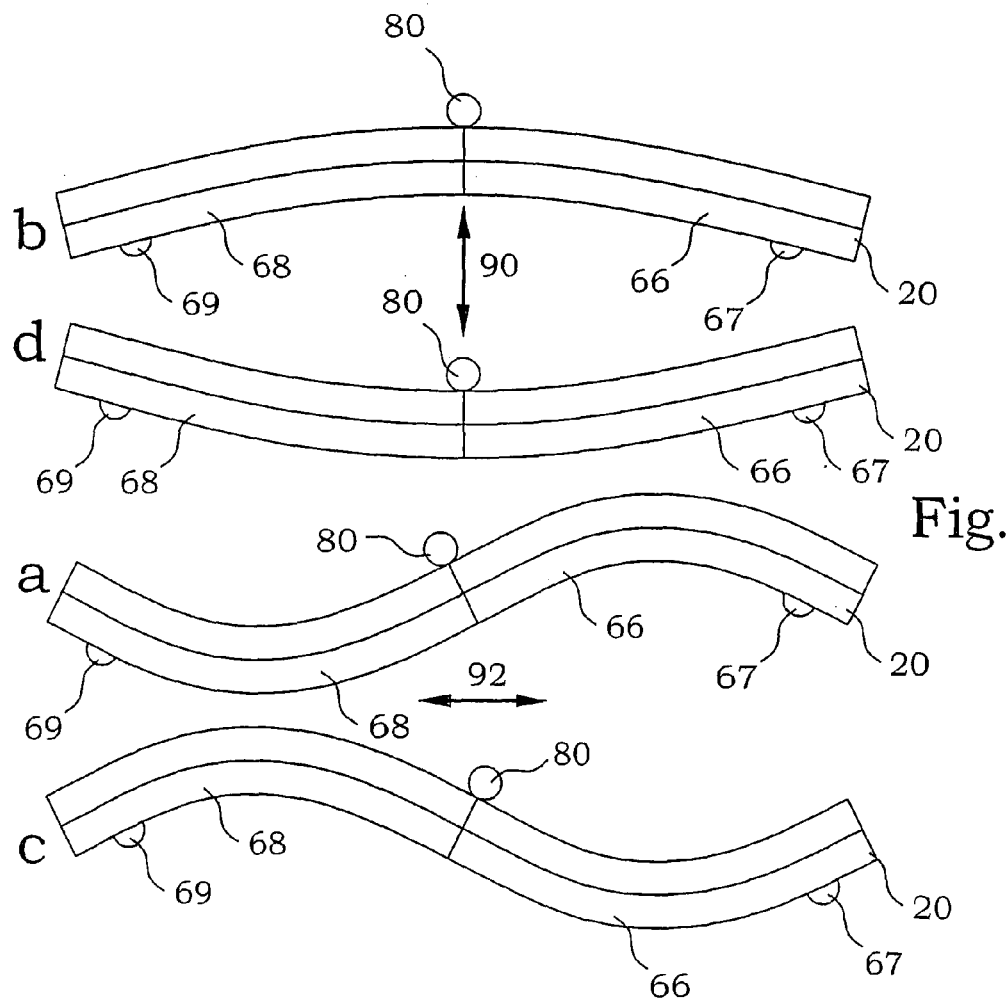
FIG. 12 illustrates bending situations of a driving element driven by the control voltage signals of FIG. 11.

In FIG. 12, a very schematic illustration of the bending pattern of the driving element is shown. Note that all strokes perpendicular to the driving element are enormously exaggerated in order to visualize the bending patterns. In the upper part of FIG. 12, the bending situation of the driving element at time $t_b$ (FIG. 11) is illustrated. An equal voltage, close to maximum voltage, is applied on both bimorph sections. This results in that both bimorph sections bend towards the body to be moved. In the next illustration in FIG. 12, the situation at time $t_d$ (FIG. 11) is illustrated. Now, the same voltage, but close to zero volt, is applied on both bimorph sections. The bending situation becomes the opposite, and the driving element bends away from the body to be moved. These two situations correspond to the extremes of a first order bending mode of the driving element, i.e. a bending mode having a motion antinode in the middle.

In the third part of FIG. 12, the bending situation of the driving element at time $t_a$ (FIG. 11) is illustrated. The voltage difference between the two bimorph sections is at maximum. This results in that one bimorph section bends towards the body to be moved and the other away from the body. In the last illustration in FIG. 12, the situation at time $t_c$ (FIG. 11) is illustrated. Now, the opposite voltages are applied, whereby also the bending situation becomes the opposite. These two latter situations correspond to the extremes of a second order bending mode of the driving element, i.e. a bending mode having a motion node in the middle, surrounded by two antinodes. From this description, it is seen that by supplying phase shifted voltage signals to the different bimorph sections, at least two bending modes are excited.

Now return to the two first situations in FIG. 12. When comparing the positions of the actuating portion 80 between these two extremes, it is possible to conclude that a vibration of the driving element 20 in the first order bending mode, or more general all odd order modes, gives a motion 90 of the actuating portion 80, with respect of the pivot supports 67, 69, perpendicular to the main displacement direction. Similarly, when comparing the positions of the actuating portion 80 in the second order bending mode (and other even order modes), one realizes that this motion 92 instead corresponds to a motion back and forth in the main displacement direction, with respect of the pivot supports 67, 69. By combining these two motions with a phase shift there between, an elliptical motion is achieved quasi-statically, which easily can be used for driving the body.

The even order modes will give movement in the main motion direction and normally the motors are optimized to operate close to this frequency. To make the drive pad release from the rail, also a vertical movement is, however, needed and the odd order modes can be used. The low amplitude of these odd modes at the resonance frequency for the even modes makes it important to find solutions where the vertical movement is enhanced.

In a general case, the first and second order bending modes have significantly different resonance frequencies. Therefore, when arranging the driving elements in a motor according to an embodiment of the present invention, efforts are made to bring the resonance frequencies closer to each other.

At mechanical resonance, the movement of the particular bending mode will shift in phase relative the voltage signal. The elliptical trajectory of the contact point of the drive pad will subsequently be changed. Typically at low Q-values, the phase shift is low and can be neglected. In one theoretical extreme case, for a free beam with high Q-value, the contact point will move more or less linearly in a direction between the tangential and vertical directions. However, when used in the motor of FIG. 10, the spring force of the drive pad 80 restricts the motion resulting in an elliptical trajectory even in this case. In general, the movement of the contact point is dependent of many parameters and the motors are preferably optimized to get stable operation within a large frequency range.

One part of the optimization can be performed already at the design of the driving element 20 and the parts with which the driving element 20 interacts with. For illustrating such measures, the motor of FIG. 7 is used as an example. The aim is to increase the resonance frequency of the first order bending mode somewhat or in general enhance any of the odd order modes. In FIG. 12, one may notice that the contact point between the driving element and any supporting surface takes place via the pivot supports, 67, 69, acting as a lever. The pivot points (interaction point between pivot support and any supporting surface) move horizontally with respect to each other. By, as in FIG. 10, arranging the pivot point (interaction point between pivot support and the spring 62) to be translational rigid, e.g. by having the right friction properties against a tangentially stiff spring 62, such a horizontal motion of the pivot points is restricted. The result of such an arrangement will be that the first order (odd order) bending mode will get a higher resonance frequency.

Moreover, by e.g. changing the height of the pivot supports 67, 69, the lever arm is changed, which in turn increases the sensitivity to the above discussed stiffness. Anyone skilled in the art realizes that the pivot point has to be arranged off-symmetry-axis of the driving element in order to give any frequency modifying effects. Otherwise the lever arm would be equal to zero and no resonance frequency effect is achieved. A tuning of the first order bending mode can thus be achieved by adjusting any of these parameters. Similarly, the stiffness of the pivot supports 67, 69 themselves, etc. do also influence the resonance frequencies.

One other optimization that can be made is to tune the stiffness of the drive pad 80 to enhance the vertical movement of the drive pad 80. This can be made both in combination with and independent of the odd vibration modes of the driving element. Typically, to have a smooth motor operation, the drive pad 80 stiffness has to be adjusted to let the drive pad be in contact with the body 60 about half the drive cycle and this will result in a spring action enhancing vertical movements.

Also after the design has been determined and the different motor parts are manufactured, there is another possibility to tune the resonant behavior. One of the most important parameters to adjust is the force of the resilient means 62 to press the drive pad 80 against the body 56. A higher force will increase the resonance frequency for most of the possible vertical vibration movements. The resonance frequency of the vertical vibrations, i.e. the odd order bending mode, can thus easily be adjusted with the force 64 during installation or at any subsequent occasion when the operation of the motor is needed. When there is a slight difference between the resonance frequency of the vertical vibrations and the tangential vibration (second order bending mode), the motors will operate rather efficiently within a large frequency range.

The drive pad 80 will of course also affect the resonance, but another important function of the drive pad 80 resilience is to reduce the impact and hence wear of drive pad 80 and the body 60.

Also the actual selection of operating frequency is of importance for the operation. By selecting an operating frequency near one or the other of these resonance frequencies, the motion path of the pad 80 can be altered. If one wants to accentuate the motion along the main displacement direction, a frequency in the vicinity of the resonance frequency for second order bending mode is advantageous. Furthermore, according to the present invention, an electrical resonance circuit having a resonance frequency in the same range as the preferred operating frequency can be created with the driving element. It is then possible to achieve the preferred relation between parallel and perpendicular motion by selecting a suitable operating frequency and then adapt the electrical resonance circuit accordingly.

If the electrical resonance frequency, as described in connection with FIG. 9, is placed between the mechanical resonance frequencies, a very large range of frequencies where the efficiency is high is provided, and there is also a possibility that the driving performance can be tuned, by simply tuning the operating frequency. Flexible, but simultaneously stable and efficient driving can in such a configuration be achieved in a relatively large frequency range.

In many of the embodiments described above, the electrical resonance frequency is positioned at a lower frequency than the mechanical resonance frequency. It is of course possible to do the opposite, i.e. to let the electrical resonance frequency exceed the mechanical resonance frequency. Embodiments with one or two mechanical resonances are discussed. In practice there are several resonant effects that can be operating and typically these are preferably designed to occur within the operation interval according to the basic ideas of the present invention.

It will be understood by those skilled in the art that various modifications and changes may be made to the present invention without departure from the scope thereof, which is defined by the appended claims.

The invention claimed is:

1. Electromechanical motor system comprising:
   a motor assembly having electromechanical driving element;
   said electromechanical driving element being arranged to actuate in both tangential and perpendicular direction on a body to be moved by use of essentially only bending modes; and
   a drive control connected to said electromechanical driving element;
   said electromechanical driving element having at least a first mechanical bending mode resonance and a second mechanical bending mode resonance, each of which having an associated resonance frequency;
   said first mechanical bending mode resonance frequency having a value in the same order of magnitude as said second mechanical bending mode resonance frequency;
   said first mechanical bending mode resonance frequency being separated from said second mechanical bending mode resonance frequency with a frequency separation smaller than $2f_{r1}/Q_1$, $Q_1$ being the lowest quality value among quality values of said first mechanical bending mode resonance and said second mechanical bending mode resonance, respectively, $f_{r1}$ being a resonance frequency of the resonance having the quality value of $Q_1$;
   said first mechanical bending mode having a stroke direction parallel to a stroke direction of said second bending mode;
   said electromechanical driving element being supported by pivot supports, allowing ends of said electromechanical driving element to move;
   said driving element having only one single actuating portion for interacting with said body to be moved; and
   said driving element having a main extension essentially parallel to a main displacement direction of said body to be moved.

2. Electromechanical motor system according to claim 1, wherein said drive control in turn comprises a voltage supply and an inductive element forming an electrical resonance circuit together with said electromechanical driving element, said electrical resonance circuit having an electrical resonance frequency in the same order of magnitude as at least one of said first and said second mechanical bending mode resonance frequencies.

3. Electromechanical motor system comprising:
a motor assembly having electromechanical driving element;
said electromechanical driving element being arranged to actuate in both tangential and perpendicular direction on a body to be moved by use of essentially only bending modes; and
a drive control connected to said electromechanical driving element;
said electromechanical driving element having at least a first mechanical bending mode resonance and a second mechanical bending mode resonance, each of which having an associated resonance frequency;
said first mechanical bending mode resonance frequency having a value in the same order of magnitude as said second mechanical bending mode resonance frequency;
said first mechanical bending mode having a stroke direction parallel to a stroke direction of said second bending mode;
said electromechanical driving element being supported by pivot supports, allowing ends of said electromechanical driving element to move;
wherein said drive control in turn comprises a voltage supply and an inductive element forming an electrical resonance circuit together with said electromechanical driving element, said electrical resonance circuit having an electrical resonance frequency in the same order of magnitude as at least one of said first and said second mechanical bending mode resonance frequencies, and
wherein said electrical resonance frequency is situated between said first mechanical bending mode resonance frequency and said second mechanical bending mode resonance frequency.

4. Electromechanical motor system according to claim 1, wherein said driving element has a first bimorph section and a second bimorph section.

5. Electromechanical motor system according to claim 4, wherein said drive control is arranged to supply said first bimorph section with a first drive voltage and to supply said second bimorph section with a second drive voltage, said first and second drive voltages having the same frequency and being phase shifted relative to each other.

6. Electromechanical motor system according to claim 5, wherein said first and second bimorph sections have a main extension essentially parallel to a main displacement direction of said body, said single actuating portion being arranged substantially between said first and second bimorph sections, whereby said first mechanical resonance frequency is an odd order bending mode of said driving element perpendicular to said main displacement direction, said odd order bending mode having a motion antinode in a vicinity of said actuating portion, and said second mechanical resonance frequency is an even order bending mode of said driving element perpendicular to said main displacement direction, said even order bending mode having a motion node in said vicinity of said actuating portion.

7. Electromechanical motor system according to claim 6, wherein said first and second bimorph sections are supported against a means providing stiffness in said main displacement direction by said pivot supports, said pivot supports being arranged on each side, in the main displacement direction, of said actuating portion, whereby contact points between said pivot supports and said means providing stiffness are positioned off a symmetry axis of said driving element.

8. Method of operating an electromechanical motor system having a motor assembly in turn having electromechanical driving element, and a drive control connected to said electromechanical driving element, comprising the steps of:
supplying voltage signals from said drive control to said electromechanical driving element;
said voltage signals causing said electromechanical driving element to actuate in both tangential and perpendicular direction a body to be moved by use of essentially only bending modes;
supporting said electromechanical driving element on pivot supports, allowing ends of said electromechanical driving element to move;
said electromechanical driving element having only one single actuating portion for interacting with said body to be moved;
said electromechanical driving element having a main extension essentially parallel to a main displacement direction of said body to be moved;
said driving element having at least a first mechanical bending mode resonance with an associated first mechanical bending mode resonance frequency and a second mechanical bending mode resonance with an associated second mechanical bending mode resonance frequency;
said first mechanical bending mode having a stroke direction parallel to a stroke direction of said second bending mode; and
tuning at least one of said first mechanical bending mode resonance frequency and said second mechanical bending mode resonance frequency to assume values in the same order of magnitude as each other;
said step of tuning comprising the step of providing a minor frequency separation between said first mechanical bending mode resonance frequency and said second mechanical bending mode resonance frequency;
said frequency separation being smaller than $2f_{r1}/Q_1$, where $Q_1$ being the lowest quality value among quality values of said first mechanical bending mode resonance and said second mechanical bending mode resonance, respectively, $fr_1$ being a resonance frequency of the resonance having the quality value of $Q_1$.

9. Method according to claim 8, wherein said step of tuning comprises the step of adjusting a force pressing said electromechanical driving element and said body to be moved together.

10. Method according to claim 8, wherein said first mechanical bending mode has a stroke direction parallel to a stroke direction of said second bending mode.

11. Method according to claim 8, wherein said electrical resonance frequency is situated between said first mechanical bending mode resonance frequency and said second mechanical bending mode resonance frequency.

* * * * *